United States Patent
Babazadeh et al.

(10) Patent No.: US 9,556,852 B2
(45) Date of Patent: Jan. 31, 2017

(54) METHOD OF DETERMINING INDIVIDUAL SET POINTS IN A POWER PLANT CONTROLLER, AND A POWER PLANT CONTROLLER

(71) Applicant: VESTAS WIND SYSTEMS A/S, Aarhus N (DK)

(72) Inventors: Mehrdad Babazadeh, Aarhus V (DK); Saed Ehsani, Aarhus (DK); Martin Ansbjerg Kjær, Harlev J (DK); Henrik B. Møller, Egå (DK)

(73) Assignee: VESTAS WIND SYSTEMS A/S, Aarhus N. (DK)

( * ) Notice: Subject to any disclaimer, the term of this patent is extended or adjusted under 35 U.S.C. 154(b) by 0 days.

(21) Appl. No.: 14/428,465

(22) PCT Filed: Sep. 3, 2013

(86) PCT No.: PCT/DK2013/050276
§ 371 (c)(1),
(2) Date: Mar. 16, 2015

(87) PCT Pub. No.: WO2014/071948
PCT Pub. Date: May 15, 2014

(65) Prior Publication Data
US 2015/0275862 A1    Oct. 1, 2015

Related U.S. Application Data

(60) Provisional application No. 61/711,474, filed on Oct. 9, 2012.

(30) Foreign Application Priority Data

Sep. 17, 2012    (DK) ............................ PA 2012 70570

(51) Int. Cl.
F03D 7/00    (2006.01)
F03D 9/00    (2016.01)
(Continued)

(52) U.S. Cl.
CPC ................. F03D 9/005 (2013.01); F03D 7/00 (2013.01); F03D 7/048 (2013.01); H02J 3/18 (2013.01);
(Continued)

(58) Field of Classification Search
CPC ................ H02J 3/18; H02J 3/46; H02J 3/386; F03D 7/00; F03D 7/048; F03D 9/005; Y02E 40/30
(Continued)

(56) References Cited

U.S. PATENT DOCUMENTS 6,925,363 B2 * 8/2005 Hutton ..................... H02J 3/14
307/31
7,805,222 B2 * 9/2010 Jurkat ..................... F03D 7/028
290/44

(Continued)

FOREIGN PATENT DOCUMENTS

DE    102010006142 A1    8/2011
EP    1790851 A2    5/2007
(Continued)

OTHER PUBLICATIONS

Danish Search Report for PA 2012 70570, Apr. 24, 2013.
International Search Report for PCT/DK2013/050276, Mar. 6, 3014.

*Primary Examiner* — Julio Gonzalez Ramirez
(74) *Attorney, Agent, or Firm* — Patterson + Sheridan, LLP

(57) ABSTRACT

This invention relates to a method and a power plant controller arranged to carry out the method. The method is
(Continued)

on an intelligent dispatching of the power production to wind turbines and optional compensation equipment of a wind power plant, as the power producing units of a wind power plant. The invention relates to a case where the requested produced power (both active and reactive) is less than the total capacity of the power plant, and the invention relates to utilizing this situation to dispatch set points to the wind turbines and the compensation equipment based on correction factors relating to the operating conditions of the wind park. This method may increase the wind turbines' life time, help in scheduling maintenance and expand the electrical operating range of the wind power plant.

19 Claims, 4 Drawing Sheets

(51) Int. Cl.
F03D 7/04 (2006.01)
H02J 3/18 (2006.01)
H02J 3/38 (2006.01)
H02J 3/48 (2006.01)
H02J 3/50 (2006.01)
H02J 3/46 (2006.01)
H02J 3/28 (2006.01)
H02J 3/30 (2006.01)
H02J 3/32 (2006.01)

(52) U.S. Cl.
CPC ............... *H02J 3/386* (2013.01); *H02J 3/46* (2013.01); *H02J 3/48* (2013.01); *H02J 3/50* (2013.01); *H02J 3/28* (2013.01); *H02J 3/30* (2013.01); *H02J 3/32* (2013.01); *Y02E 10/723* (2013.01); *Y02E 10/763* (2013.01); *Y02E 10/766* (2013.01); *Y02E 40/30* (2013.01)

(58) Field of Classification Search
USPC ....... 290/44, 55; 700/287, 286; 307/155, 69, 307/43
See application file for complete search history.

(56) References Cited

U.S. PATENT DOCUMENTS

| | | | |
|---|---|---|---|
| 8,527,104 B2* | 9/2013 | Arinaga | F03D 7/0284 700/281 |
| 2007/0124025 A1* | 5/2007 | Schram | F03D 7/0224 700/287 |
| 2008/0150283 A1* | 6/2008 | Rivas | H02J 3/1885 290/44 |
| 2010/0025994 A1* | 2/2010 | Cardinal | F03D 7/0284 290/44 |
| 2010/0298991 A1* | 11/2010 | Alonso Sadaba | F03D 7/0272 700/276 |
| 2015/0249415 A1* | 9/2015 | Babazadeh | H02P 9/02 290/44 |
| 2015/0267686 A1* | 9/2015 | Kjær | F03D 7/0224 290/44 |

FOREIGN PATENT DOCUMENTS

| | | |
|---|---|---|
| EP | 1879277 A2 | 1/2008 |
| EP | 2020506 A2 | 2/2009 |
| EP | 2221957 A1 | 8/2010 |
| EP | 2256341 A1 | 12/2010 |
| WO | 01/25630 A1 | 4/2001 |
| WO | 2011/104273 A2 | 9/2011 |
| WO | WO 2014/026688 A1 * | 2/2014 |

* cited by examiner

METHOD OF DETERMINING INDIVIDUAL SET POINTS IN A POWER PLANT CONTROLLER, AND A POWER PLANT CONTROLLER

FIELD OF THE INVENTION

Embodiments of the invention generally relate to a method of determining individual set points in a power plant controller arranged to control a wind power plant comprising a plurality of wind turbine generators and optional compensation equipment capable of generating electrical output, a wind power plant controller as well as a computer readable storage medium comprising program code instructions which, when executed by a power plant controller in a wind power plant, cause the power plant controller to carry out the method of the invention.

BACKGROUND

In recent years, there has been an increased focus on reducing emissions of greenhouse gases generated by burning fossil fuels. One solution for reducing greenhouse gas emissions is developing renewable sources of energy. Particularly, energy derived from the wind has proven to be an environmentally safe and reliable source of energy, which can reduce dependence on fossil fuels.

Energy in wind can be captured by a wind turbine, which is a rotating machine that converts the kinetic energy of the wind into mechanical energy, and the mechanical energy subsequently into electrical power. A plurality of wind turbines generators may be arranged together in a wind park, wind farm or wind power plant to generate sufficient energy to support an electrical grid. A wind power plant may be located onshore or offshore, and it often covers large geographical areas. Each wind turbine generator typically includes or is connected to a wind turbine controller, and the wind power plant typically includes a central controller, often referred to as a power plant controller, central controller or master controller, operatively coupled to the wind turbine controllers of the individual wind turbine generators. The power plant controller is arranged to receive information from the wind turbine controllers, e.g. in relation to the power output and/or measurement values from the wind turbine generators, and the power plant controller is arranged to transmit information to the wind turbine generators, e.g. in order to obtain a requested output from the wind turbine generators.

These factors usually render it necessary to provide a variety of networked interconnections and communication technologies for monitoring and controlling the wind power electric generating facilities.

In a wind power plant with a plurality of wind turbine generators, the focus has moved away from the separate wind turbine generator connection points to the central wind power plant connection point, often referred to as the "point of common coupling", and the control of individual wind turbines is supplemented by an overall control carried out by a wind power plant controller or master controller, arranged to control the components of the wind power plant by transmitting setpoints on e.g. active and reactive power to be provided at the point of common coupling. In very large wind power plants, more than one point of common coupling may exist, and more than one power plant controller may exist. One limiting factor when performing central control of a wind power plant with several wind turbine generators is the time it takes to gather and condition information from the individual wind turbine generators, transmitting the information to the central controller or power plant controller and distributing control data, e.g. new active or reactive power set points from the power plant controller to the wind turbine controllers.

The term "components of the wind power plant" is meant to denote the energy producing or energy generating components of the wind power plant, viz. the wind turbine generators and optionally compensation equipment capable of generating electrical output.

It is an important task for the power plant controller to provide optimum set points on active and reactive power to be generated by each of the wind turbine generators and compensation equipment, if it is comprised in the wind power plant.

SUMMARY OF THE INVENTION

Embodiments of the invention generally relate to provision of set points by a power plant controller to be sent to the wind turbine generators and optional compensation equipment of the wind power plant.

One embodiment of the invention provides a method of determining individual set points in a power plant controller arranged to control a wind power plant comprising a plurality of wind turbine generators and optional compensation equipment capable of generating electrical output, the individual set points relating to active and/or reactive power to be requested from each wind turbine generator in the plurality of wind turbines and the optional compensation equipment for delivery to an external electrical grid, the method comprising the steps of: (a) receiving a request for active and/or reactive power to be delivered to the external electrical grid; (b) determining correction factors for each of wind turbine generators in the plurality of wind turbine generators and for the optional compensation equipment, said correction factors relating to condition information on the plurality of wind turbine generators and the optional compensation equipment; (c) receiving signals indicating available active power and available reactive power from each of said wind turbine generators as well as from the optional compensation equipment; (d) comparing the requested active power with said indicated available active power from the plurality of wind turbines and the optional compensation equipment of the wind power plant, and comparing the requested reactive power with said indicated available reactive power of the wind turbines and the optional compensation equipment; (e) in the case where the comparison in step (d) shows that the requested active power is less than the available active power of the wind turbines and the optional compensation equipment and/or the requested reactive power is less than the available reactive power of the wind turbines and the optional compensation equipment, carrying out the step of (f) calculating said individual set points relating to active power and/or reactive power based on the correction factors and the received signals indicating available active power and reactive power from the wind turbine generators and the optional compensation equipment.

It should be noted that the terms "available active power" and "available reactive power", respectively, in relation to a wind turbine generator, are meant to denote a the active power and reactive power, respectively, available for production by the wind turbine generator in view of the wind speed experienced by the wind turbine generator. The total available power of a wind power plant is typically a summed signal obtained from the signals sent from the individual wind turbine generators on their available active and reactive power. This available active and reactive power of a wind turbine generator may be different from the nominal power of the wind turbine generator, due to the wind speed. The available active and reactive power of the wind power generator may even be higher than the nominal active and reactive power, respectively, of the wind turbine generator, e.g. 5% higher. Operating a wind turbine generator at a power above the nominal power, however, may be limited due to the actual loads of the wind turbine generator and/or it may be carried out only at a specified or limited amount of time.

Another embodiment of the invention provides a wind power plant controller arranged for determining individual set points to be sent to a plurality of wind turbine generators and optionally to compensation equipment arranged to generate electrical output, the individual set points relating to active and/or reactive power to be requested from each of the wind turbines and the optional compensation equipment for delivery to a point of common coupling of the wind power plant to an external grid, wherein the power plant controller comprises a receiver for receiving a request for active and/or reactive power from outside the wind power plant. The wind power plant controller moreover comprises a correction factor determination unit arranged to determine correction factors for each of wind turbine generators in the plurality of wind turbine generators and for the optional compensation equipment, said correction factors relating to condition information on each of the wind turbine generators and the optional compensation equipment. Furthermore, the wind power plant controller comprises a receiver for receiving signals indicating available active power and available reactive power from each of said wind turbine generators as well as from the optional compensation equipment. A comparator unit arranged for comparing the requested active power with said indicated available active power from the plurality of the wind turbines and the optional compensation equipment, and comparing the requested reactive power with said indicated available reactive power of the plurality of wind turbines and the compensation equipment of the wind power plant is also comprised in the wind power plant controller as well as a calculation unit arranged to, in the case where the comparator indicates that the requested active power is less than the available active power of the wind turbines and the optional compensation equipment of the wind power plant and/or the requested reactive power is less than the available reactive power of the wind turbines and the optional compensation equipment of the wind power plant, to calculate individual set points relating to active power and/or reactive power based on the correction factors and the indicated available active power and reactive power from the wind turbine generators and the optional compensation equipment.

Yet another embodiment of the invention provides a computer readable storage medium comprising program code instructions which, when executed by a power plant controller in a wind power plant, cause the power plant controller to carry out the method of the invention.

BRIEF DESCRIPTION OF THE DRAWINGS

Embodiments of the present invention are explained, by way of example, and with reference to the accompanying drawings. It is to be noted that the appended drawings illustrate only examples of embodiments of this invention and are therefore not to be considered limiting of its scope, for the invention may admit to other equally effective embodiments.

DETAILED DESCRIPTION

Figure 1:
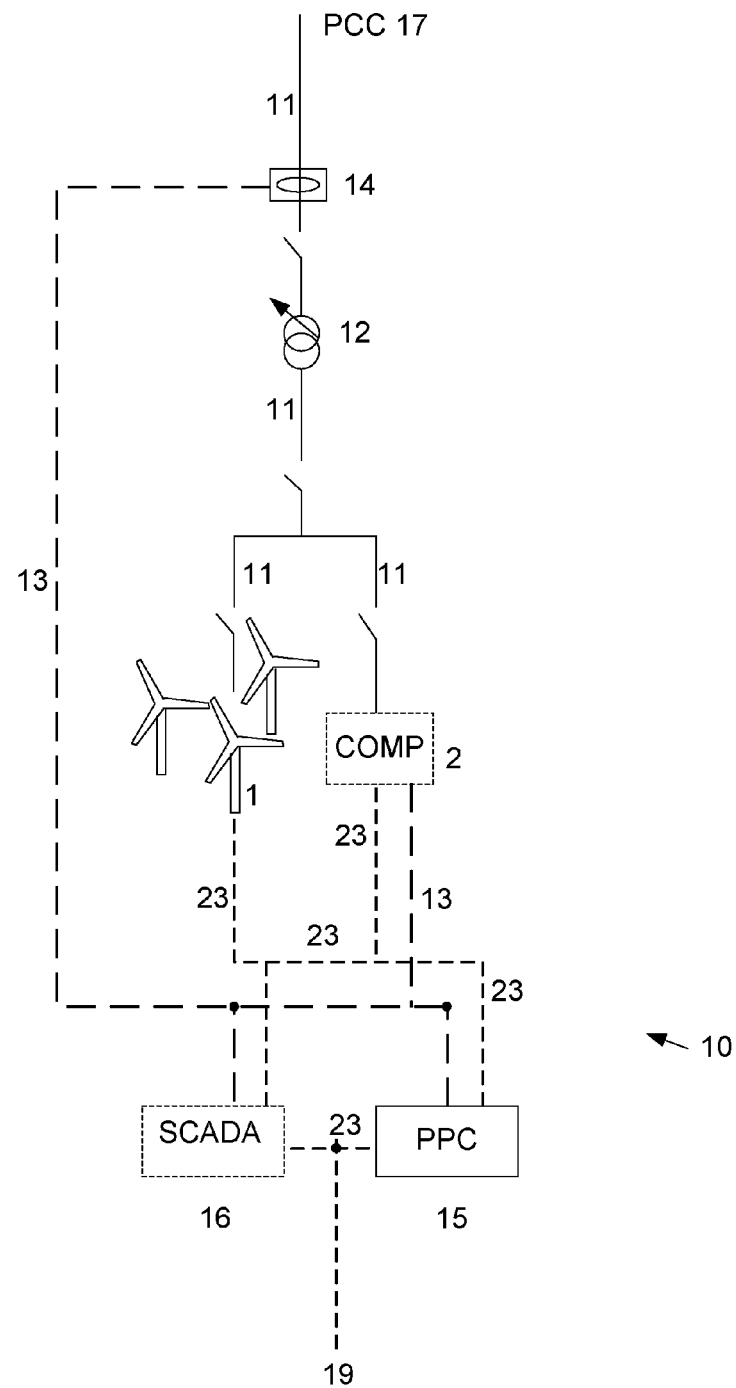
FIG. 1 illustrates a simplified view of a wind power plant.

In the following, reference is made to embodiments of the invention. However, it should be understood that the invention is not limited to specific described embodiments. Instead, any combination of the following features and elements, whether related to different embodiments or not, is contemplated to implement and practice the invention.

Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s). Throughout the figures, similar entities are denoted with similar reference signs.

One embodiment of the invention provides a method of determining individual set points in a power plant controller arranged to control a wind power plant comprising a plurality of wind turbine generators and optional compensation equipment capable of generating electrical output, the individual set points relating to active and/or reactive power to be requested from each of wind turbine generators in the plurality of wind turbines and the optional compensation equipment for delivery to an external electrical grid, the method comprising the steps of: (a) receiving a request for active and/or reactive power to be delivered to the external electrical grid; (b) determining correction factors for each of the wind turbine generators and for the optional compensation equipment, said correction factors relating to condition information on the wind turbine generators and the optional compensation equipment; (c) receiving signals indicating available active power and available reactive power from each of said wind turbine generators as well as from the optional compensation equipment; (d) comparing the requested active power with said indicated available active power from the plurality of wind turbines and the optional compensation equipment of the wind power plant, and comparing the requested reactive power with said indicated available reactive power of the wind turbines and the optional compensation equipment; (e) in the case where the comparison in step d) shows that the requested active power is less than the available active power of the wind turbines and the optional compensation equipment and/or the requested reactive power is less than the available reactive power of the wind turbines and the optional compensation equipment, carrying out the step of (f) calculating said individual set points relating to active power and/or reactive power based on the correction factors and the received signals indicating available active power and reactive power from the wind turbine generators and the optional compensation equipment.

By determining correction factors at the level of the wind turbine generators and optional compensation equipment and using such correction factors in the wind power plant controller in the determination of individual set points to be sent to the wind turbine generators and optional compensation equipment, a range of factors that influence the performance of the wind turbine generators and compensation equipment in the short term as well as in the longer term may be taken into consideration. When the total electrical output to be generated by the plurality of wind turbine generators and the optional compensation equipment is less than the total capacity, the wind power plant controller is arranged determine set points in a flexible way by use of the correction factors. This flexibility may increase the life time of the individual wind turbine generators, and/or it may assist in maintenance scheduling.

It should be noted, that the steps of the method has been given reference signs (a) to (f) for ease of understanding only, and that the method steps may be carried out in any appropriate order. For instance, step (a) could be carried out simultaneously with or after step (b) or step (c), and the order of steps (b) and (c) could be interchanged.

Furthermore, it should be noted, however, that the request for active and/or reactive power needs not be received from outside the power plant controller, in that the power plant controller may be arranged to determine the power to be delivered based on measurements in the point of common coupling and any grid codes for the external electrical grid. However, the request for active and/or reactive power may also be received from outside the wind power plant, e.g. from a wind power plant owner or utility grid operator.

The term "compensation equipment" is meant to denote any appropriate active and/or reactive power compensation equipment. Reactive power compensation equipment may comprise candidates from the following, but is not limited to the mentioned candidates: Switched capacitor banks, switched inductor banks, static condensers, synchronous condensers and STATCOMs. The reactive power compensation is used to control either the power factor, the level of reactive power flowing or to control voltage level of the point of common coupling. The active power compensation equipment may comprise candidates from the following, but is not limited to the mentioned candidates: energy storages, e.g. in the form of an electrical battery, a flywheel, an ultra-capacitor, a condenser, hybrid hydro plants, photovoltaic cells, and fuel cells. The active power compensation is used to control the power factor, the level of active power, the frequency or the control voltage level of the point of common coupling. Thus, active power compensation may be used for i.a. grid code compliance, improving quality of power, production levelling, enabling overproduction, enabling production levelling, obtaining power reserves. All of these measures are related and familiar to the person skilled in art of electrical power generation. The compensation equipment may thus be seen as having distinct parts, where one part may be one kind of active or reactive compensation equipment, and other parts may be other units of the same or another kind of active and reactive compensation equipment. Just as an example, the compensation equipment could comprise an energy storage in the form of a battery, a photovoltaic cell as well as a STATCOM. In this example, the compensation may be seen as having three parts, viz. the battery, the photovoltaic cell and the STATCOM. However, one of these compensation components may be used to control the other, in which case the power plant controller may see the three parts of the compensation equipment as one.

The term "optional compensation equipment" is meant to denote that the wind power plant may include compensation equipment, but it is not obligatory that the wind power plant does include such compensation equipment. In the case wherein no compensation equipment is included in the wind power plant, the wind power plant controller will act accordingly, and no set points on active or reactive power to be contributed from such compensation equipment will either not be generated or transmitted.

The term "set points relating to active and/or reactive power" is meant to denote the references on active and/or reactive power to be requested from each wind turbine generator in the plurality of wind turbines and the optional compensation equipment, and the term "individual set points" is meant to denote that the wind power plant controller is arranged for defining set points to be sent to the plurality of wind turbine generators and the compensation equipment of the wind power plant, where these set points are not necessarily identical. Thus, the wind power plant controller is arranged to assign set points to the individual wind turbine generators and the optional compensation equipment according to the correction factors, and the set points sent to different wind turbine generators will typically be different from each other. However, it should be noted that in some instances it might happen that the set points are identical; however, they are assigned to the individual wind turbine generators based on individual considerations as indicated by the correction factors.

Set points relating to active and/or reactive power may be set points indicating an active and/or reactive power to be provided from a wind turbine generator or compensation equipment; however, set points relating to active and/or reactive power may also indicate a power factor to be generated or current signals combined with voltage signals to be generated from the plurality of wind turbine generators and optional compensation equipment.

In general, there are two major steps to produce a predefined amount of power (P and Q) by a wind power plant. First step is to set two reference powers ($P_{ref}$ & $Q_{ref}$) by a Power Plant Controller, where the two reference powers are the total powers from the different power producing units of the wind power plant. The second step is to assign/dispatch a requested power to each power producing unit of the wind power plant. This may be seen as equivalent to indicating a set of individual set points ($P_{ref}$, $Q_{ref}$) to each wind producing unit of the wind power plant, where the set of individual set points $P_{ref}$, $Q_{ref}$ comprises two set points for the active and reactive power, respectively, from each wind turbine generator, as well as set points from active and/or reactive power from compensation equipment. Thus, the set points $P_{ref}$, $Q_{ref}$ may include two set points, $p_{ref,i}$ and $q_{ref,i}$, for the active and reactive power, respectively, to be requested from i-th wind turbine generator as well as one or two set points $p_{ref,j}$, $q_{ref,j}$ for active power and/or the reactive power, respectively, to be requested from the j-th piece of compensation equipment.

The correction factors may be prioritisation factors indicating the capability of the plurality of wind turbine generators and optional compensation equipment relative to the other wind turbine generators and optional compensation equipment. Hereby, the correction factors may indicate a capability of wind turbine generators in the plurality of wind turbine generators and the optional compensation equipment to take a relatively bigger portion of the production relative to other wind turbine generators and optional compensation equipment. It should be noted, however, that more than one wind turbine generator may be allocated the same correction factor indicating the same prioritization.

When the correction factors are prioritisation factors indicating the capability of the plurality of wind turbine generators and the optional compensation equipment relative to the other wind turbine generators and the optional compensation equipment, the wind power plant controller may determine the individual set points in a flexible way taking the relative capabilities of the power producing units of the wind power plant into account. The prioritisation factors indicate which power producing units that are to take a larger share of the energy production than other power producing units. Hereby, the power producing units that may be in a relatively better shape than the rest of the power producing units, may be allocated a relatively larger share of the production compared to a situation where all wind turbine generators were allocated identical shares of the production. This flexibility may increase the life time of the individual wind turbine generators, and/or it may assist in maintenance scheduling. "Power producing units" is a term that is meant to include wind turbine generators as well as compensation equipment, if it is comprised in the wind power plant.

The correction factors are determined based on one or more of the following: wind conditions, operating characteristics, component conditions, wind power plant topology, ageing of the individual wind turbine generators of the wind power plant, and ageing of the optional compensation equipment. Moreover, the correction factors are also determined on the basis of energy price considerations. Thus, the health status of the wind turbine generators and the optional compensation equipment, as well as their distance from the point of common coupling, the loads on the wind turbine generators and other factors may be taken into account in the dispatching of setpoints to the individual components of the wind power plant.

The wind conditions may comprise one or more of the following factors: wind direction, wind speed, turbulence level and wind shear. Such wind conditions may be determined by any appropriate way, e.g. by anemometers or LIDARs, by sensors at the wind turbine generators, etc. The levels of turbulence might be very different throughout the wind power plant. Sending relatively lower set points to the wind turbine generators experiencing the hardest turbulence saves lifetime of the wind turbine generators. The level of turbulence may e.g. be measured with blade load sensors at the individual wind turbine generators.

The operation characteristics may comprise one or more of the following factors: optimal operation point of the individual wind turbine generators; the optimal operation point of the optional compensation equipment; the electrical operational range of the individual wind turbine generators, the electrical operational range of the optional compensation equipment; operating history of the individual wind turbine generators; operation history of the optional compensation equipment; production state of each of the wind turbine generators; and production state of the optional compensation equipment. Such operation characteristics are thus characteristics of the wind turbine generators and/or compensation equipment as determined at these power producing units. The operation characteristics may be transmitted directly from the power producing units to the wind power plant controller in order to contribute to the determination of the correction factors at the wind power plant controller.

The component conditions may comprise one or more of the following: sensor measurements of components in the wind turbine generators; the age of the individual wind turbine generators; the age of the optional compensation equipment; service reports on the individual wind turbine generators; service report on the optional compensation equipment. Thus, component conditions may relate to the conditions of specific components of the power producing units, such as e.g. the electrical generator of a wind turbine generator, the temperature of critical components in a wind turbine generator, such as the electrical generator, and/or the component conditions may relate to overall values of the individual power producing units, such as the age. Service reports from all power producing elements of the wind power plant may thus influence the correction factor. The power plant controller may take information from such service reports into account when determining the set-points to the individual wind turbine generators and the compensation equipment, if it is comprised in the wind power plant, so that for example a STATCOM and some of the wind turbine generators are asked to provide reactive power according to the healthiness of each of these elements and not according to pre-defined sharing values.

The wind power plant topology may include one or more of the following factors: input on potential shadowing of one wind turbine generator for another, in dependency of the wind direction; and input on electrical losses from the wind turbine generators and the optional compensation equipment to a point of common coupling of the wind power plant to an external electrical grid.

In a case where one wind turbine generators shadow for another, such that an up-wind turbine generator reduces the local wind speed at one or more down-wind turbine generators, the productions of these wind turbine generators may advantageously be seen in combination for two reasons:
  up-wind wind turbine generators subtract energy from the wind causing reduced potential available electrical output from the down-wind wind turbine generators.
  the up-wind wind turbine generators cause additional turbulence on the down-wind turbines, resulting in more stresses and thus in shorter lifetime, and potentially lower production in that the down-wind wind turbine generators may be de-rated to protect them against the turbulence.

By curtailing an up-wind wind turbine generator more than the down-wind wind turbine generator might lead to a better overall loading of the wind turbine generators. Of course, this is a wind-direction-dependent feature as the interaction travels with the wind, so that depending on the wind direction different wind turbine generators may be up-wind or down-wind wind turbine generators.

The ageing of the wind turbine generators comprise one or more of the following factors: the actual age of the one or more components of the wind turbine generators; previous set points sent to the wind turbine generators; and the number of times where the wind turbine generators have been shut down or pausing. The ageing of the optional compensation equipment comprise one or more of the following factors: the actual age of the compensation equipment; the previous set points sent to the compensation equipment; and the number of times where the compensation equipment has been disconnected or deactivated.

Changes in the power set points may have an impact on the wind turbine generators, so the frequency and the amplitudes of the set-point changes issued from the wind power plant controller to the individual turbines could advantageously be included in the determination of the individual set points. Moreover, the actual age of components in the wind turbine generators and/or compensation equipment may have an influence in the determination of the set points by the wind power plant controller. For example, if the generator of a given wind turbine or the battery of a battery based compensation equipment has recently been replaced, this specific wind turbine or compensation equipment can be requested more production in order to save component use of other wind turbines.

The calculation carried out in step (f) is a combined calculation of the individual set points of the active and reactive power for the wind turbine generators in the plurality of wind turbine generators of the wind power plant and the reactive power from the optional compensation equipment. The term "combined calculation" is meant to denote that the active and reactive set points are determined by the wind power plant controller by taking due account of relevant factors influencing the active and reactive power setpoints. Thus, the active and reactive power may be determined in substantially the same step. Moreover, similar factors are taken into consideration for the determination of the setpoints for active and reactive power. The active and reactive set points may be determined by the same unit of the wind power plant controller. By using correction factors and by the combined calculation of the individual setpoints of active and reactive power for the individual power producing components of the wind power plant, the P-Q-chart of the wind power plant as a whole may be changed, in that the electrical operating range of the wind power plant may be expanded.

The calculation of said individual set points in step (f) may furthermore be based on one or more of the following factors: information on an internal electrical grid in the wind power plant connecting the wind turbine generators and optional compensation equipment to the point of common coupling; and information on the wind turbine generators on whether they are active or non-active. The information on internal electrical grid may e.g. include information on grid topology, including electrical impedance, so that losses between a wind turbine generator or compensation equipment and the point of common coupling may be taken into consideration.

The calculation of said individual set points in step (f) is carried out by use of an Optimal Load Flow technique or optimisation of a cost function. Both of these cases relate to advantageous optimisation techniques that may be arranged to take a variety of factors into account.

The wind power plant controller and the computer program product of the invention entail similar features and advantages as described in connection with the method The following is a detailed description of embodiments of the invention depicted in the accompanying drawings. The embodiments are examples and are in such detail as to clearly communicate the invention. However, the amount of detail offered is not intended to limit the anticipated variations of embodiments; but on the contrary, the intention is to cover all modifications, equivalents, and alternatives falling within the spirit and scope of the present invention as defined by the appended claims.

FIG. 1 illustrates a simplified view of a wind power plant 10. The exemplary wind park or wind power plant 10 of FIG. 1 has a plurality of wind turbine generators 1; however, due to simplicity of the figure only three wind turbine generators are shown in FIG. 1. The number of wind turbine generators 1 in the wind power plant may be any appropriate number, e.g. any number between 2 and hundreds, e.g. 10, 20, 50 or 100 wind turbine generators. Even though the three wind turbine generators 1 shown in FIG. 1 are shown close to each other, it should be noted that the wind turbine generators 1 of the wind power plant 10 may be distributed over a large area; this may entail that the wind speed, wind shear, wind turbulence as well as the electrical impedance between the wind turbine generator and a point of common coupling may vary considerably between the wind turbine generators 1 in the wind power plant 10.

The wind power plant 1 may optionally comprise compensation equipment 2 arranged to provide active and/or reactive power. This optional compensation equipment may thus be active power compensation equipment, reactive power compensation equipment or a combination of the two. In FIG. 1 the optional compensation equipment 2 is shown as one unit; however, it should be noted that the optional compensation equipment 2 may be more than one unit. Reactive power compensation equipment may comprise candidates from the following, but is not limited to the mentioned candidates: Switched capacitor banks, switched inductor banks, static condensers, synchronous condensers and STATCOMs. The reactive power compensation is used to control either the power factor, the level of reactive power flowing or to control voltage level of the point of common coupling. The active power compensation equipment may comprise candidates from the following, but is not limited to the mentioned candidates: energy storages, e.g. in the form of an electrical battery, a flywheel, an ultra-capacitor, a condenser, hybrid hydro plants, photovoltaic cells, and fuel cells. The active power compensation is used to control the power factor, the level of active power, the frequency or the control voltage level of the point of common coupling Each wind turbine generator 1 has a rotor with rotor blades rotatably supported in a nacelle which is mounted on a tower. The rotor is arranged to drive a generator. The electric current produced by the generator may be converted by a converter to a current adapted to the fixed grid frequency, e.g. by a full-scale converter or a converter of a doubly-fed induction generator (DFIG). The converter enables current to be produced with an arbitrary phase, as desired, relative to the grid voltage, thereby enabling variable reactive power to be produced. The converter also allows the voltage amplitude produced to be varied within certain limits. Each wind turbine generator has a local controller that commands the wind turbine generator to produce electricity with a specific phase and voltage.

Each wind turbine generator 1 has terminals at which the wind turbine generator outputs the electric power produced. The wind turbines generators 1 of the wind park 10 are electrically connected to a point of common coupling (PCC) 17 by a wind-park-internal grid 11. The internal grid has a tree-like structure in which the wind turbine generators 1 or, more specifically, the terminals of the individual wind turbine generators, form the leaves of the tree, and the point of common coupling (PCC) 17 forms the root of the tree. The internal grid is typically a medium voltage grid, and the electrical output from the wind turbine generators 1 are transformed to a high voltage by transformer 12 located downstream of the point of common coupling (PCC) 17.

The point of common coupling PCC 17 is the point where the wind park is electrically connected to the utility grid (not shown in FIG. 1), more specifically to an external branch line which leads to the utility grid. For an off-shore wind park the external branch line may be an undersea line which connects the wind park 10 to the utility grid on land. It should be noted that more than one point of common coupling may exist for connected a wind power plant to one or more external grids. This could e.g. be in case of very large wind power plants.

The wind park 10 is equipped with a wind power plant controller 15. The wind power plant controller 15 communicates with the individual wind turbine generator 1's controllers via a control network 23. The control network 23 is, for example, implemented as a bus system, i.e. a CAN bus or an Ethernet bus. In FIG. 1, control lines 23 and measurement lines 13 are drawn as broken lines to distinguish them from power-grid lines 11 drawn as full lines.

The wind power plant controller PPC 15 has several inputs, two of which are illustrated in FIG. 1. One of the inputs is an external control input 19 through which an external entity, e.g., a utility grid operator can provide a prescription or demand information pertaining to the electricity to be delivered by the wind power plant 10. For example, the utility-grid operator can demand that the wind power plant 10 delivers a certain voltage V or amount of reactive power Q at the PCC 17. Other demands by the utility-grid operator may be an upper limit on the active power produced by the wind park 10, e.g. in the case of an over-frequency in the utility grid. The information signal for the external control input 19 is not necessarily a demand signal; in some embodiments it is a functional parameter which defines the central controller's response to parameters measured in the wind park 10. For example, in some embodiments it is the slope of a droop function defining a mapping of measured voltage to reactive power to be produced. Moreover, an external control input may be received from a supervisory control and data acquisition system (SCADA) 16.

The second input to the wind power plant controller PPC 15 illustrated in FIG. 1 is a central measurement input obtained from a point of measurement 14 and transmitted over measurement lines 13. The signal of the second input is, for example, a signal representing the voltage and/or reactive power measured at the point of measurement 14, which may be, for example, at the PCC 17. Alternatively, the point of measurement 14 where the voltage and/or reactive power is measured may be upstream of the PCC 17 in the internal grid, or downstream the PCC 17.

The wind power plant controller PPC 15 has a reference output to the control network 23.

The local wind-turbine generator's controllers have several inputs. One of the inputs is a reference input from the control network. The second input is a local measurement input. The signal representing the local measurement input may be the voltage and/or reactive power measured at the terminals of the associated wind turbine 1.

Both the wind power plant controller 15 and the local wind turbine generator's controllers may be feedback controllers which compare two inputs and produce a control signal based on the difference between the two inputs.

The control network 23 may be a bi-directional network enabling two-way communication between the wind power plant controller 15 and the individual wind turbine generator 1's controllers. For example, the downlink direction (i.e. the direction from the wind power plant controller 15 to the individual wind turbine generator 1's controllers) may be used to send reference values, e.g., for voltage and/or reactive power, from the wind power plant controller 15 to the individual wind turbine generator 1's. The uplink direction may be used by the wind turbine generators 1 to return information about their current operational state, e.g. about the amount of active power currently produced, to the wind power plant controller 15.

The reference output by the wind power plant controller 15 could be, in some wind power plants, a common reference value to all the wind turbine generators 1. In those wind power plants, all the wind turbines 1 of the wind park 10 are requested to produce the same voltage or reactive power, according to the common reference value. In a wind power plant comprising a power plant controller according to the invention, the wind turbine generators 1 receive individual reference values from the wind power plant controller 15. For example, when some of the wind turbine generators 1 have informed the wind power plant controller 15 that they are operating at nominal power while other wind turbines 1 have informed the wind power plant controller 15 that they are operating at partial load (i.e. below nominal power) the wind power plant controller 15 can make use of a current margin still left in the converter of the partial-load wind turbine generators 1 by requesting them, e.g. to produce more reactive power than the wind turbine generators operating at nominal power. However, the method is not limited to wind turbine generators operating at or below the nominal power. The method is also applicable to a situation where wind turbine generators are capable of producing more than their nominal power limit. For instance, under suitable wind conditions some of the wind turbine generators may volunteer to produce up to e.g. 10% more than their nominal power without exceeding their nominal loads. In this case the power plant controller can request that these wind turbine generators produce produce 5-10% more for the sake of saving lifetime of the remaining wind turbine generators having worse conditions. Consequently, the correction factor would vary from wind turbine generator to wind turbine generator based on the correction factor.

The wind power plant 10 may be connected to a SCADA (supervisory control and data acquisition) system 16 arranged to monitor and/or control the wind power plant. The SCADA system may provide input to the wind power plant controller 15 and it may receive input from the wind turbine generators 1.

In FIG. 1, the SCADA system 16 and the compensation unit 2 are shown with broken lines in order to indicate that they are optional.

Figure 2:
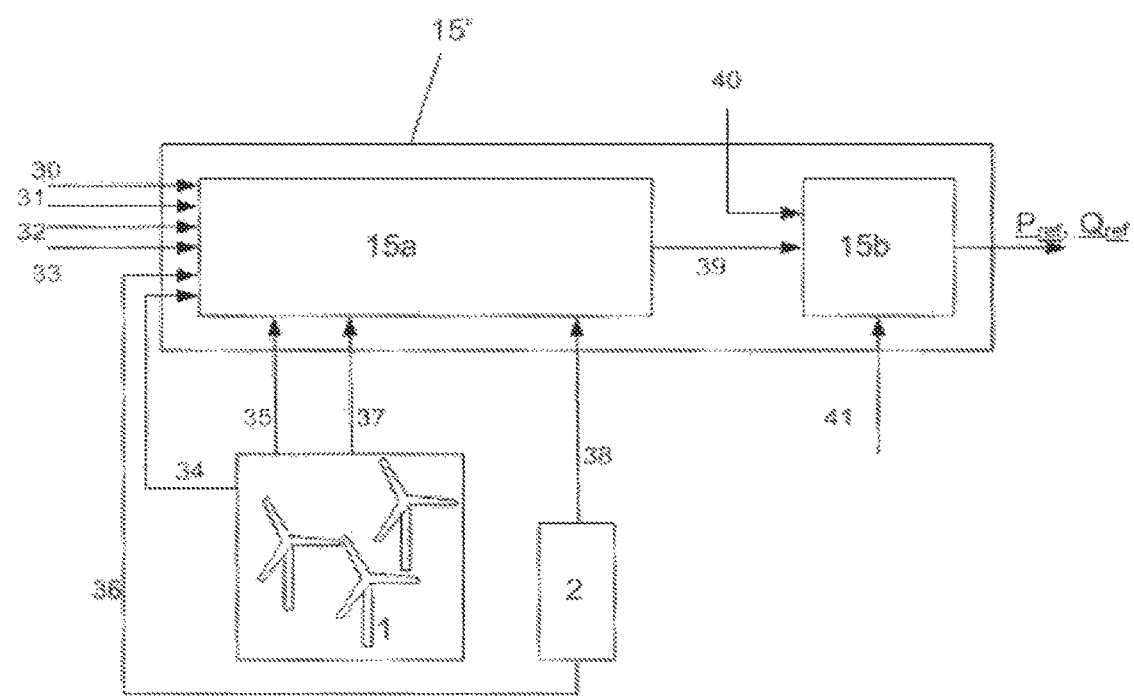
FIGS. 2 and 3 illustrate schematic views of a wind power plant controller according to the invention.

FIG. 2 illustrates a schematic view of a wind power plant controller 15 according to the invention. FIG. 2 also shows a plurality of wind turbine generators 1 and compensation equipment 2. As described in connection with FIG. 1, the compensation equipment 2 may comprise active as well as reactive power compensation equipment.

The wind power plant controller 15 comprises a first unit 15a and a second unit 15b, as well as a receiver for receiving signals 30-37 from the wind turbine generators 1 as well as from the optional compensation equipment 2. Even though the power plant controller 15 is shown to comprise two distinct units, 15a and 15b, it should be noted that these two units may be combined or integrated into one unit.

The first unit may be seen as a correction unit 15a arranged to receive the signals 30-37 from the wind turbine generators 1, the optional compensation equipment 2 as well as other signals 30-33, and to use information in the signals 30-37 to generate correction factors in relation to the wind turbine generators 1 and the optional compensation equipment 2. The signals received by the correction unit 15a may include a signal 30 comprising repair and/or service information on the individual wind turbine generators 1; a signal 31 on the previous dispatching history of setpoints to the individual wind turbine generators 1; a signal 32 on wind data at the location of each of the individual wind turbines 1, where such wind data may include e.g. wind direction, wind speed, turbulence level, wind shear, etc., for the individual wind turbine generators 1; and energy price, viz. the price to which it is possible to sell the energy produced by the wind turbine generators 1 and the optional compensation equipment 2. The signals 30-32 thus relate to factors that are specific for the individual wind turbine generators and thus may differ between the individual wind turbine generators, whilst the energy price info of the signal 33 would be the same no matter which component of the wind part would provide the electrical output.

It should be noted that the term "dispatch" is meant to cover the action of assigning a requested power to the individual components of the wind power plant, viz. the wind turbine generators and the optional compensation equipment, e.g. by sending setpoints to the wind turbine generators and the optional compensation equipment on reactive power, active power, power factor, voltage, current or other electrical characteristics of an electrical power output to be generated by the components for delivery at the point of common coupling.

The signals received by the power plant controller 15 or the correction unit 15a also includes a signal 34 indicating the condition or state of the individual wind turbine generator, such as remaining life time of the individual wind turbine generators or of components thereof, sensor or state info from the individual wind turbine generators 1, information on the optimal operating point of the individual wind turbine generators 1, input on whether the individual wind turbine generators 1 are active or non-productive, and other information relevant on the individual wind turbine generators 1. Moreover, the relative location of the individual wind turbine generators 1 in the wind power plant may be sent in a signal 35. This information may be relevant in a calculation of wake or shadow effects between the individual wind turbine generators 1 in the wind power plant. Furthermore, a signal 37 on the available active and reactive power for production at the individual wind turbine generators 1 is sent from the wind turbine generators 1 to the power plant controller 15.

The compensation equipment 2, if it is present in the wind power plant, is also arranged to transmit a signal 38 on its available active and reactive power to the wind power plant controller 15 or the correction unit 15a thereof. Moreover, the compensation equipment, if it is present in the wind power plant, is arranged to transmit a signal 36 indicating the state or condition of thereof to the wind power plant controller 15 or the correction unit 15a thereof. Such state information 36 may relate to the optimum operating point of the compensation equipment 2, charging status in case the compensation equipment is a battery, the energy level of a battery or other relevant state information The correction unit 15a is arranged to determine correction factors for each of the plurality of wind turbine generators and for the optional compensation equipment, if it is present in the wind power plant 10, where these correction factors take into account some of or all of the signals 30-36.

The correction unit 15a is arranged to transmit a signal 39 to the second unit 15b on the correction factors and/or the indicated available active power from the plurality of the wind turbine generators 1 and the optional compensation equipment 2. This signal 39 may be a signal obtained by correcting the signal 37 on the available active and reactive power from the individual wind turbine generators 1 and the signal 38 on available active and reactive power of the compensation equipment 2 to a signal 39 indicating a modified available active and reactive power from the wind turbine generators and the optional compensation equipment by means of the correction factors. This modified or indicated available power signal 39 thus indicates the total available power from the energy producing components of the wind power plant modified to take into consideration other perspectives than the amount of energy that may be generated presently, such as long term perspectives, optimum ways of controlling the individual components compared to the remaining energy producing components, etc.

The correction factors typically are a vector of numerical factors, containing one or more correction factor for each wind turbine generator and one or more correction factor for each part of the compensation equipment. Each correction factor for each wind turbine generator and each part of the compensation equipment may be a number smaller than 1, equal to 1 or larger than 1. The signal 37 sent from each wind turbine generator 1 to the wind power plant controller 15 on its available active and reactive power may thus be corrected by the correction factors for the individual wind turbine generator 1 to obtain a modified signal on available active and reactive power. It should be noted, that the signal 37 may contain separate signals for the active and reactive powers from the individual wind turbine generators 1, and that the correction factor for the active power for any wind turbine generator 1 may differ from the correction factor for the reactive power for the wind turbine generator 1.

The modified or indicated available power signal 39 typically is a summed signal obtained from the signals 37 sent from the individual wind turbine generators on their available active and reactive power corrected by the appropriate correction factors for the active and reactive power for each wind turbine generator 1 individually as well as from the signals 38 sent from the individual parts of the compensation equipment 2 on their available active and reactive power corrected by the appropriate correction factors for the active and reactive power for each part of the compensation equipment 2 individually.

The power plant controller 15 also contains a receiver for receiving a request 40 for active and/or reactive power to be generated by the components 1, 2 of the wind power plant for delivery at the point of common coupling. This receiver is not shown specifically in FIG. 2. The second unit 15b of the power plant controller 15 may be denoted "dispatching unit 15b" in that it is arranged to assign individual setpoints on active and/or reactive power to the individual components of the wind power plant 10.

The dispatching unit comprises a comparator unit (not shown in FIG. 2) arranged for comparing the powers requested in the signal 40 and the modified available powers as indicated in the signal 39. Thus, the comparator unit may compare the requested active power from the wind power plant 10 with the indicated available active power from the plurality of the wind turbines and the optional compensation equipment of the wind power plant; and the comparator unit may additionally or alternatively compare the requested reactive power indicated in the signal 40 with the available reactive power of the plurality of wind turbines and the compensation equipment of the wind power plant as indicated in the signal 39. In the case where the comparison of the comparator unit indicates that the requested active power is less than the available active power of the wind turbines and optional compensation equipment of the wind power plant and/or that the requested reactive power is less than the available reactive power of the wind turbines and optional compensation equipment of the wind power plant, the dispatching unit 15b calculates individual set points, $P_{ref}$, $Q_{ref}$, relating to active power (in case of $P_{ref}$) and/or reactive power (in case of $Q_{ref}$) based on the correction factors and the indicated available active power and reactive power from the wind turbine generators and the optional compensation equipment. The individual set points $P_{ref}$, $Q_{ref}$ sent from the power plant controller 15 to the energy producing units of the wind power plant 10, contains a range of individual setpoints, typically two set points $p_{ref,i}$ and $q_{ref,i}$ for the active and reactive power, respectively, to be requested from i-th wind turbine generator as well as one or two set points $p_{ref,j}$, $q_{ref,j}$ for active power and/or the reactive power, respectively, to be requested from the j-th part of the compensation equipment 2.

As indicated in FIG. 2, a further signal 41 may be input to the dispatching unit 15b of the power plant controller 15. This further signal 41 is optional, and comprises information on the internal electrical grid in the wind power plant connecting the wind turbine generators and optional compensation equipment to the point of coupling, such as information on the impedances between the individual components of the wind power plant and the point of common coupling to which the components are connected to an external grid. The further signal 41 may also comprise information on whether the wind turbine generators are active or non-active. The further signal 41 may be used by the dispatching unit 15b in the determination of the set points to be allocated to the individual components of the wind power plant 10.

Figure 3:
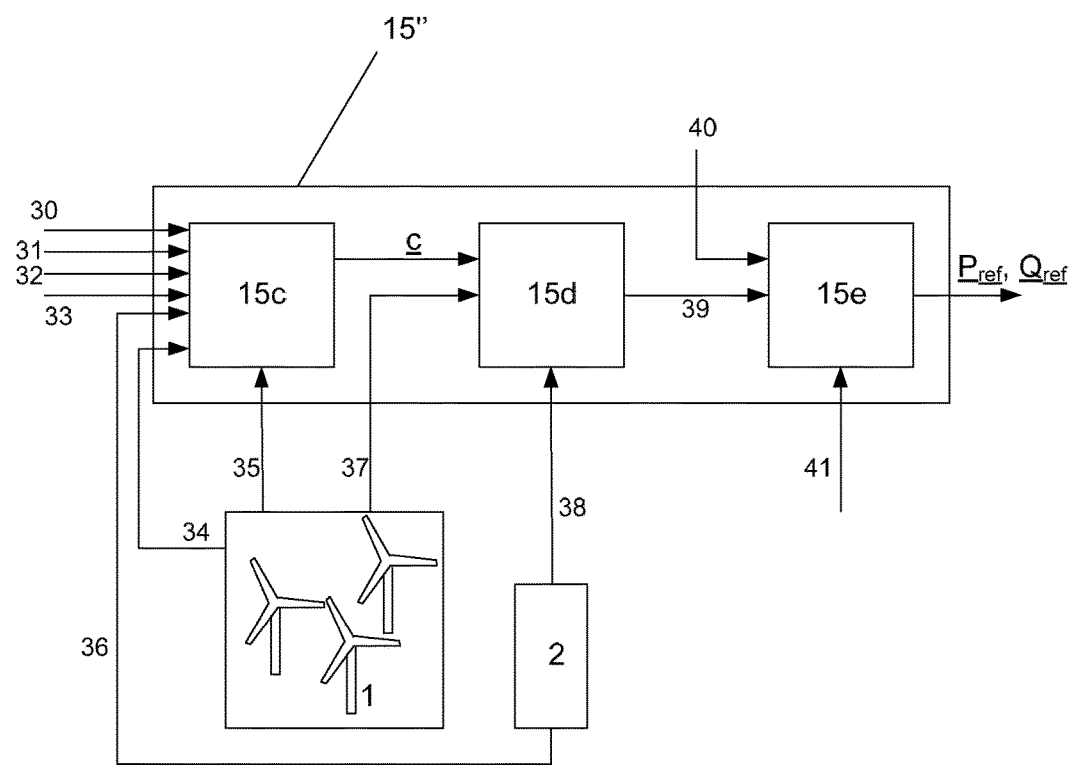

FIG. 3 illustrates a schematic view of an alternative wind power plant controller 15' according to the invention. The power plant controller 15' is shown to comprise three distinct units, 15c, 15d and 15e. It should be noted, however, that these three units may be combined or integrated into one unit.

The first unit may be seen as a correction unit or correction factor determining unit 15c arranged to receive the signals 30-37 from the wind turbine generators 1, the optional compensation equipment 2 as well as other signals 30-33, and to use information in the signals 30-37 to generate correction factors in relation to the wind turbine generators 1 and the optional compensation equipment 2. The signals received by the correction unit 15c may include a signal 30 comprising repair and/or service information on the individual wind turbine generators 1; a signal 31 on the previous dispatching history of setpoints to the individual wind turbine generators 1; a signal 32 on wind data at the location of each of the individual wind turbines 1, where such wind data may include e.g. wind direction, wind speed, turbulence level, wind shear, etc., for the individual wind turbine generators 1; and energy price, viz. the price to which it is possible to sell the energy produced by the wind turbine generators 1 and the optional compensation equipment 2. The signals 30-32 thus relate to factors that are specific for the individual wind turbine generators and thus may differ between the individual wind turbine generators, whilst the energy price info of the signal 33 would be the same no matter which component of the wind part would provide the electrical output.

The signals received by the power plant controller 15' or the correction unit 15c also includes a signal 34 indicating the condition or state of the individual wind turbine generator, such as remaining life time of the individual wind turbine generators or of components thereof, sensor or state info from the individual wind turbine generators 1, information on the optimal operating point of the individual wind turbine generators 1, input on whether the individual wind turbine generators 1 are active or non-productive, and other information relevant on the individual wind turbine generators 1. Moreover, the relative location of the individual wind turbine generators 1 in the wind power plant may be sent in a signal 35. This information may be relevant in a calculation of wake or shadow effects between the individual wind turbine generators 1 in the wind power plant.

Moreover, the compensation equipment, if it is present in the wind power plant, is arranged to transmit a signal 36 indicating the state or condition of thereof to the wind power plant controller 15' or the correction unit 15c thereof. Such state information 36 may relate to the optimum operating point of the compensation equipment 2, charging status in case the compensation equipment is a battery, or other relevant state information.

The correction unit 15c is arranged to determine correction factors for each of the plurality of wind turbine generators and for the optional compensation equipment, if it is present in the wind power plant 10, where these correction factors take into account some of or all of the signals 30-36. The correction factors are sent as a correction factor signal c from the correction factor determining or correction unit 15c to the second unit 15d of the power plant controller 15'. This second unit 15d may also be denoted parameterisation unit 15d.

The parameterisation unit 15d also receives a signal 37 on the available active and reactive power for production at the individual wind turbine generators 1, sent from the wind turbine generators 1 to the power plant controller 15. The compensation equipment 2, if it is present in the wind power plant, is also arranged to transmit a signal 38 on its available active and reactive power to the wind power plant controller 15' or the parameterization unit 15d thereof.

The parameterisation unit 15d is arranged to use the correction factors from the correction factor signal c as well as the signals 37 and 38 on available active and reactive power from the wind turbine generators 1 and the optional compensation equipment 2 to create a signal 39 on modified available power from the energy producing units 1, 2 of the wind power plant 10.

As described in connection with FIG. 2, the signal 39 may be a signal obtained by correcting the signal 37 on the available active and reactive power from the individual wind turbine generators 1 and the signal 38 on available active and reactive power of the compensation equipment 2 to a signal 39 indicating a modified available active and reactive power from the wind turbine generators and the optional compensation equipment, by means of the correction factors c. This modified or indicated available power signal 39 thus indicates the total available power from the energy producing components of the wind power plant modified to take into consideration other perspectives than the amount of energy that may be generated presently, such as long term perspectives, optimum ways of controlling the individual components compared to the remaining energy producing components, etc.

The correction factors c typically are a vector of numerical factors, containing one or more correction factor for each wind turbine generator and one or more correction factor for each part of the compensation equipment. For example, the correction factors may contain one correction factor for the active power from each wind turbine and another correction factor for the reactive power from each wind turbine. Moreover, the correction factors may contain one correction factor for the active power from each part of the compensation equipment as well as one correction factor for the reactive power from each part of the compensation equipment. In the case where a part of the compensation equipment is arranged for providing only reactive power, no correction factor is necessary for the active power thereof, and vice versa.

The signal 37 sent from each wind turbine generator 1 to the wind power plant controller 15' on its available active and reactive power may thus be corrected by the correction factors for the individual wind turbine generator 1 to obtain a modified signal on available active and reactive power, in the parameterization unit 15d. It should be noted, that the signal 37 may contain separate signals for the active and reactive powers from the individual wind turbine generators 1, and that the correction factor for the active power for any wind turbine generator 1 may differ from the correction factor for the reactive power for the wind turbine generator 1.

The modified or indicated available power signal 39 typically is a summed signal obtained from on the signals 37 sent from the individual wind turbine generators on their available active and reactive power corrected by the appropriate correction factors for the active and reactive power for each wind turbine generator 1 individually as well as from the signals 38 sent from the individual parts of the compensation equipment 2 on their available active and reactive power corrected by the appropriate correction factors for the active and reactive power for each part of the compensation equipment 2 individually.

The power plant controller 15' also contains a receiver for receiving a request 40 for active and/or reactive power to be generated by the components 1, 2 of the wind power plant for delivery at the point of common coupling. This receiver is not shown specifically in FIG. 2. The third unit 15e of the power plant controller 15' may be denoted "dispatching unit 15e" in that it is arranged to assign individual setpoints on active and/or reactive power to the individual components of the wind power plant 10.

The dispatching unit 15e comprises a comparator unit (not shown in FIG. 2) arranged for comparing the powers requested in the signal 40 and the modified available powers as indicated in the signal 39. Thus, the comparator unit may compare the requested active power from the wind power plant 10 with the indicated available active power from the plurality of the wind turbines and the optional compensation equipment of the wind power plant; and the comparator unit may additionally or alternatively compare the requested reactive power indicated in the signal 40 with the available reactive power of the plurality of wind turbines and the compensation equipment of the wind power plant as indicated in the signal 39. In the case where the comparison of the comparator unit indicates that the requested active power is less than the available active power of the wind turbines and optional compensation equipment of the wind power plant and/or that the requested reactive power is less than the available reactive power of the wind turbines and optional compensation equipment of the wind power plant, the dispatching unit 15e calculates individual set points relating to active power and/or reactive power based on the correction factors and the indicated available active power and reactive power from the wind turbine generators and the optional compensation equipment. As described in connection with FIG. 2, the dispatching unit 15e calculates individual set points, $P_{ref}$, $Q_{ref}$, relating to active power (in case of $P_{ref}$) and/or reactive power (in case of $Q_{ref}$) based on the correction factors and the indicated available active power and reactive power from the wind turbine generators and the optional compensation equipment. The individual set points $P_{ref}$, $Q_{ref}$ sent from the power plant controller 15 to the energy producing units of the wind power plant 10, contains a range of individual setpoints, typically two set points $p_{ref,i}$ and $q_{ref,i}$ for the active and reactive power, respectively, to be requested from i-th wind turbine generator as well as one or two set points $p_{ref,j}$, $q_{ref,j}$ for active power and/or the reactive power, respectively, to be requested from the j-th part of the compensation equipment 2.

As indicated in FIG. 3, a further signal 41 may be input to the dispatching unit 15e of the power plant controller 15'. This further signal 41 is optional, and comprises information on the internal electrical grid in the wind power plant connecting the wind turbine generators and optional compensation equipment to the point of coupling, such as information on the impedances between the individual components of the wind power plant and the point of common coupling to which the components are connected to an external grid. The further signal 41 may also comprise information on whether the wind turbine generators are active or non-active. The further signal 41 may be used by the dispatching unit 15e in the determination of the set points to be allocated to the individual components of the wind power plant 10.

Figure 4:
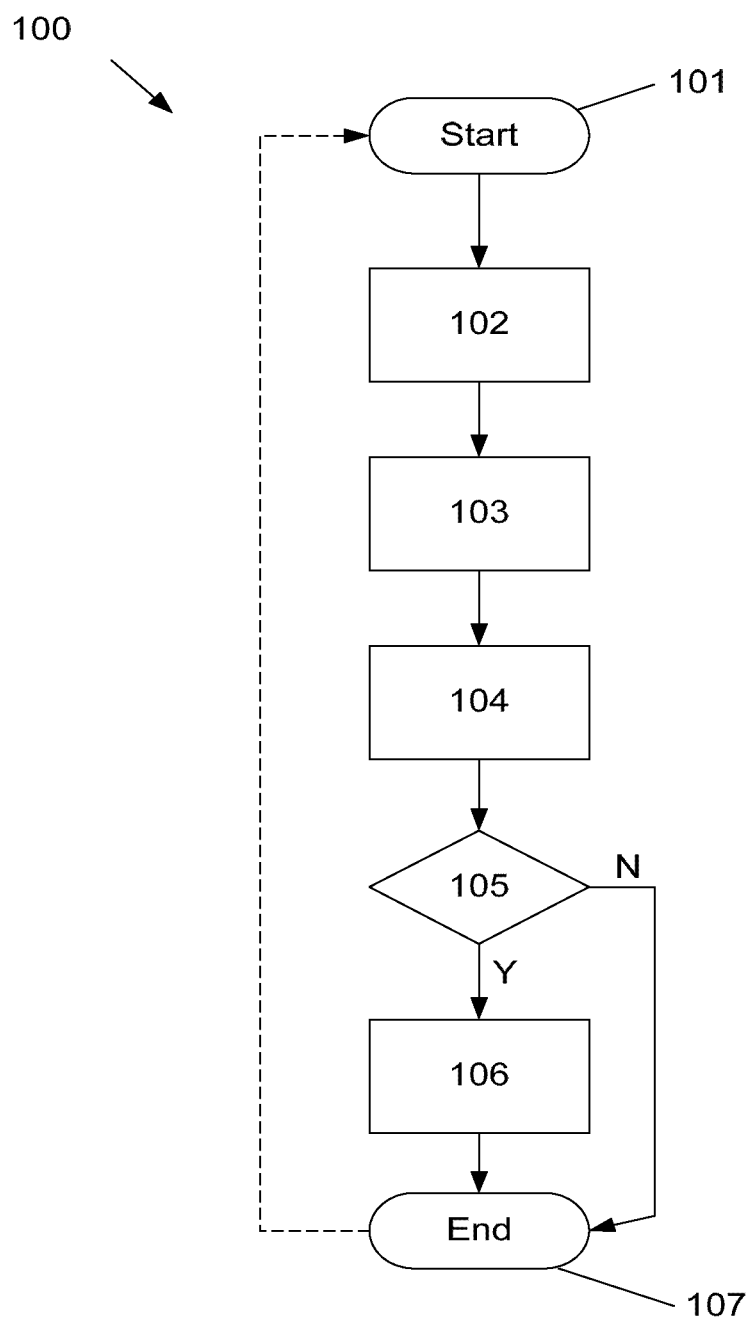
FIG. 4 illustrates a flow chart of a method according to the invention.

FIG. 4 illustrates a flow chart of a method 100 according to the invention. The method 100 relates to determining individual set points in a power plant controller 15. The power plant controller 15 is arranged to control a wind power plant 10 comprising a plurality of wind turbine generators 1 and optional compensation equipment 2. Both the wind turbine generators 1 and the optional compensation equipment 2 are capable of generating electrical output, in the form of e.g. active and/or reactive power. The individual set points generated by the power plant controller 15 relate to active and/or reactive power to be requested from each wind turbine generator 1 in the plurality of wind turbines and from the optional compensation equipment 2, if it is present in the power plant, for delivery to an external electrical grid, viz. to a point of common coupling 17 connecting the internal electrical grid in the power plant to an external electrical grid.

The method starts in step 101 and continues to step 102, wherein the power plant controller receives a request for active (P) and/or reactive power (Q) to be delivered to the external electrical grid. It should be noted, however, that the request for active and/or reactive power needs not be received from outside the power plant controller, in that the power plant controller may be arranged to determine the power to be delivered based on measurements in the point of common coupling and any grid codes for the external electrical grid.

In a subsequent step 103, the power plant controller 15 determines correction factors for each wind turbine generator in the plurality of wind turbine generators and for the compensation equipment, if it is present in the wind power plant. The correction factors relate to condition information on the plurality of wind turbine generators and the optional compensation equipment.

In a subsequent step, step 104, the power plant controller receives signals indicating available active power and available reactive power from each of said wind turbine generators as well as signals indicating available active power and available reactive power from the optional compensation equipment.

Subsequently, in step 105, the power plant controller compares the requested active power with said indicated available active power from the plurality of wind turbines and the optional compensation equipment of the wind power plant, and compares the requested reactive power with said indicated available reactive power of the wind turbines and the optional compensation equipment. In case the comparison in step 105 shows that the total available active power from the energy producing units of the wind power plant, viz. the wind turbine generators and the different compensation equipment, equals or is less than the requested active power and that the total available reactive power from the energy producing units of the wind power plant equals or is less than the requested reactive power, the method ends in step 107.

However, in the case where the comparison in step 105 shows that the requested active power is less than the available active power of the wind turbines and the optional compensation equipment and/or the requested reactive power is less than the available reactive power of the wind turbines and the optional compensation equipment, the method continues to step 106.

In step 106, the power plant controller calculates the individual set points relating to active power and/or reactive power based on the correction factors and the received signals indicating available active power and reactive power from the wind turbine generators and the optional compensation equipment. Thus, for each wind turbine generator individually a set point on active power and a set point on reactive power are generated, and the set point for the different wind turbine generators may be equal to or different from the set points determined for other wind turbine generators of the wind power plant. Moreover, if one or more pieces of compensation equipment exist in the wind power plant, the power plant controller calculates set points on active and/or reactive power for each such unit of compensation equipment. Typically, in the case of reactive compensation equipment, the power plant controller would generate a set point for active power equalling zero, or the power plant would simply not generate a set point for active power to be generated from purely reactive compensation equipment. Similarly, in case of purely active compensation equipment, the power plant controller would generate a set point for reactive power equalling zero, or not set point on reactive power at all.

It should be noted, that the steps of the method 100 in FIG. 4 may be carried out in any appropriate order. For instance, step (102) could be carried out simultaneously with or after step (103) or step (104), and the order of steps (103) and (104) could be interchanged.

The method ends in step 107. However, as indicated by the broken line from step 107 to step 101, the method may be repeated. In one embodiment, the method 100 may be repeated substantially continuously, so that the method starts again whenever it has been finalized. Alternatively, the method may be repeated at certain time intervals.

Method 100, acts thereof, and various embodiments and variations of this method and these acts, individually or in combination, may be defined by computer-readable signals tangibly embodied on one or more computer-readable media, for example, non-volatile recording media, integrated circuit memory elements, or a combination thereof. Computer readable media can be any available media that can be accessed by a computer. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, other types of volatile and non-volatile memory, any other medium which can be used to store the desired information and which can accessed by a computer, and any suitable combination of the foregoing.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, wireless media such as acoustic, RF, infrared and other wireless media, other types of communication media, and any suitable combination of the foregoing.

Computer-readable signals embodied on one or more computer-readable media may define instructions, for example, as part of one or more programs, that, as a result of being executed by a computer, instruct the computer to perform one or more of the functions described herein (e.g., method 100, or any acts thereof), and/or various embodiments, variations and combinations thereof. Such instructions may be written in any of a plurality of programming languages, for example, Java, J#, Visual Basic, C, C#, or C++, Fortran, Pascal, Eiffel, Basic, COBOL, etc., or any of a variety of combinations thereof. The computer-readable media on which such instructions are embodied may reside on one or more of the components of the power plant controller 15, 15' described herein, may be distributed across one or more of such components, and may be in transition therebetween.

The computer-readable media may be transportable such that the instructions stored thereon can be loaded onto any computer system resource to implement the aspects of the present invention discussed herein. In addition, it should be appreciated that the instructions stored on the computer-readable medium, described above, are not limited to instructions embodied as part of an application program running on a host computer. Rather, the instructions may be embodied as any type of computer code (e.g., software or microcode) that can be employed to program a processor to implement the above-discussed aspects of the present invention.

It should be appreciated that any single component or collection of multiple components of a computer system, for example, the power plant controller described in relation to FIGS. 1, 2 and 3, that perform the functions described herein can be generically considered as one or more controllers that control such functions. The one or more controllers can be implemented in numerous ways, such as with dedicated hardware and/or firmware, using a processor that is programmed using microcode or software to perform the functions recited above or any suitable combination of the foregoing.

Various embodiments according to the invention may be implemented on one or more computer systems. These computer systems, may be, for example, general-purpose computers such as those based on Intel PENTIUM-type processor, Motorola PowerPC, Sun UltraSPARC, Hewlett-Packard PA-RISC processors, any of a variety of processors available from Advanced Micro Devices (AMD) or any other type of processor. It should be appreciated that one or more of any type of computer system may be used to implement various embodiments of the invention.

In short, the invention relates to a method and a power plant controller arranged to carry out the method. The method is on an intelligent dispatching of the power production to wind turbines and optional compensation equipment of a wind power plant, as the power producing units of a wind power plant. The invention relates to a case where the requested produced power is less than the total capacity of the power plant, and the invention relates to utilizing this situation to dispatch set points to the wind turbines and the compensation equipment in a flexible way. This flexibility may increase the wind turbines' life time, help in scheduling maintenance and expand the electrical operating range of the wind power plant While the invention has been illustrated by a description of various embodiments and while these embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative methods, and illustrative examples shown and described. Accordingly, departures may be made from such details without departing from the spirit or scope of applicant's general inventive concept

What is claimed is:

1. A method of controlling power production for a plurality of power-producing units of a wind power plant, the plurality of power-producing units comprising a plurality of wind turbine generators, the method comprising:
    receiving a requested power to be delivered by the wind power plant, the requested power comprising a requested active power or a requested reactive power;
    determining a plurality of correction factors, each correction factor of the plurality of correction factors corresponding to a respective power-producing unit of the plurality of power-producing units and relating to condition information of the power-producing unit, wherein the plurality of correction factors comprise a plurality of prioritization factors indicating a relative power production capability of each power-producing unit of the plurality of power-producing units;
    receiving signals indicating a respective available power from each power-producing unit of the plurality of power-producing units, the available power comprising an available active power or an available reactive power of the power-producing unit; and
    upon determining that the requested power is less than a combined available power of the plurality of power-producing units:
        applying, for each power-producing unit of the plurality of power-producing units, the corresponding correction factor to the respective available power, and
        calculating active power set points or reactive power set points for each power-producing unit of the plurality of power-producing units based on the applied correction factor, wherein relative amounts of the calculated active power set points or reactive power set points for the plurality of power-producing units are proportional to the prioritization factors.

2. The method of claim 1, wherein the condition information comprises one or more of the following: wind conditions information, operation characteristics information, component conditions information, wind power plant topology information, and age information of the plurality of wind turbine generators or of compensation equipment of the wind power plant.

3. The method of claim 2, wherein the wind conditions information comprises one or more of the following: wind direction information, wind speed information, turbulence level information, and wind shear information.

4. The method of claim 2, wherein the operation characteristics information comprises one or more of the following:
    optimal operation point information of the plurality of wind turbine generators or of the compensation equipment,
    electrical operational range information of the plurality of wind turbine generators or of the compensation equipment,
    operating history information of the plurality of wind turbine generators or of the compensation equipment, and
    production state information of the plurality of wind turbine generators or of the compensation equipment.

5. The method of claim 2, wherein the component conditions information comprises one or more of the following:
    sensor measurement information for components of the plurality of wind turbine generators,
    age information of the plurality of wind turbine generators or of the compensation equipment, and
    service report information of the plurality of wind turbine generators or of the compensation equipment.

6. The method of claim 5, wherein the sensor measurement information comprises temperature measurements of the plurality of wind turbine generators.

7. The method of claim 2, wherein the wind power plant topology information comprises one or more of the following:
    potential shadowing information between wind turbine generators of the plurality of wind turbine generators based on wind direction information of the wind conditions information, and
    electrical loss information of the plurality of wind turbine generators or of the compensation equipment to a point of common coupling of the wind power plant to an external electrical grid.

8. The method of claim 2, wherein the age information of the plurality of wind turbine generators comprises one or more of the following: actual age information of one or more components of the plurality of wind turbine generators, previous set points sent to the plurality of wind turbine generators, and a count of how many times the plurality of wind turbine generators is shut down or paused.

9. The method of claim 2, wherein the age information of the compensation equipment comprises one or more of the following: actual age information of the compensation equipment, previous set points sent to the compensation equipment, and a count of how many times the compensation equipment is disconnected or deactivated.

10. The method of claim 1, wherein determining the plurality of correction factors is further based on energy price information.

11. The method of claim 1, wherein calculating active power set points or reactive power set points for each power-producing unit comprises:
    calculating active power set points and reactive power set points for each of the plurality of wind turbine generators; and
    calculating reactive power set points for the compensation equipment.

12. The method of claim 1, wherein calculating active power set points or reactive power set points for each power-producing unit is further based on one or more of the following:
- information for an internal electrical grid connecting the plurality of power-producing units to a point of common coupling of the wind power plant to an external electrical grid, and
- information for the plurality of wind turbine generators indicating whether each wind turbine generator is active or non-active.

13. The method of claim 1, wherein calculating active power set points or reactive power set points for each power-producing unit is performed using an optimal load flow technique or an optimization of a cost function.

14. The method of claim 1, wherein the plurality of power-producing units further comprises compensation equipment configured to produce active power or reactive power,
- wherein determining a plurality of correction factors comprises determining at least a first correction factor corresponding to the compensation equipment,
- wherein receiving signals indicating a respective available power from each power-producing unit comprises receiving at least a first signal corresponding to an available active power or an available reactive power of the compensation equipment, and
- wherein calculating active power set points or reactive power set points for each power-producing unit comprises calculating at least one active power set point or reactive set point for the compensation equipment based on the first correction factor and the available active power or the available reactive power indicated by the first signal.

15. The method of claim 14, wherein the condition information comprises age information of the plurality of wind turbine generators or of the compensation equipment.

16. The method of claim 14, wherein the compensation equipment comprises one or more of a switched capacitor bank, a switched inductor bank, a static condenser, a synchronous condenser, a static compensator (STATCOM), an electrical battery, a flywheel, an ultra-capacitor, a condenser, a hybrid wind-hydro plant, a photovoltaic cell, and a fuel cell.

17. A wind power plant controller for controlling power production of a plurality of power-producing units of a wind power plant, the plurality of power-producing units comprising a plurality of wind turbine generators, the wind power plant controller comprising:
- a receiver configured to:
  - receive a requested power to be delivered by the wind power plant, the requested power comprising a requested active power or a requested reactive power, and
  - receive signals indicating a respective available power from each power-producing unit of the plurality of power-producing units, the available power comprising an available active power or an available reactive power of the power-producing unit;
- a correction unit configured to determine a plurality of correction factors, each correction factor of the plurality of correction factors corresponding to a respective power-producing unit of the plurality of power-producing units and relating to condition information of the power-producing unit, wherein the plurality of correction factors comprise a plurality of prioritization factors indicating a relative power production capability of each power-producing unit of the plurality of power-producing units; and
- a calculation unit configured to, upon determining that the requested power is less than a combined available power of the plurality of power-producing units:
  - apply, for each power-producing unit of the plurality of power-producing units, the corresponding correction factor to the respective available power, and
  - calculate active power set points or reactive power set points for each power-producing unit of the plurality of power-producing units based on the applied correction factor, wherein relative amounts of the calculated active power set points or reactive power set points for the plurality of power-producing units are proportional to the prioritization factors.

18. A computer program product comprising a computer-readable device having computer-readable program code embodied therewith, the computer-readable program code executable by one or more computer processors to perform an operation for controlling power production of a plurality of power-producing units of a wind power plant, the plurality of power-producing units comprising a plurality of wind turbine generators, the operation comprising:
- receiving a requested power to be delivered by the wind power plant, the requested power comprising a requested active power or a requested reactive power;
- determining a plurality of correction factors, each correction factor of the plurality of correction factors corresponding to a respective power-producing unit of the plurality of power-producing units and relating to condition information of the power-producing unit, wherein the plurality of correction factors comprise a plurality of prioritization factors indicating a relative power production capability of each power-producing unit of the plurality of power-producing units;
- receiving signals indicating a respective available power from each power-producing unit of the plurality of power-producing units, the available power comprising an available active power or an available reactive power of the power-producing unit; and
- upon determining that the requested power is less than a combined available power of the plurality of power-producing units:
  - applying, for each power-producing unit of the plurality of power-producing units, the corresponding correction factor to the respective available power, and
  - calculating active power set points or reactive power set points for each power-producing unit of the plurality of power-producing units based on the applied correction factor, wherein relative amounts of the calculated active power set points or reactive power set points for the plurality of power-producing units are proportional to the prioritization factors.

19. A method of controlling power production for a plurality of power-producing units of a wind power plant, the plurality of power-producing units comprising a plurality of wind turbine generators, the method comprising:
- receiving a requested power to be delivered by the wind power plant, the requested power comprising a requested active power or a requested reactive power;
- determining a plurality of correction factors, each correction factor of the plurality of correction factors corresponding to a respective power-producing unit of the plurality of power-producing units and relating to condition information of the power-producing unit;

receiving signals indicating a respective available power from each power-producing unit of the plurality of power-producing units, the available power comprising an available active power or an available reactive power of the power-producing unit; and upon determining that the requested power is less than a combined available power of the plurality of power-producing units:

applying, for each power-producing unit of the plurality of power-producing units, the corresponding correction factor to the respective available power, and calculating active power set points or reactive power set points for each power-producing unit of the plurality of power-producing units based on the applied correction factor, wherein calculating active power set points or reactive power set points for each power-producing unit comprises multiplying the corresponding correction factor with the respective available power indicated by the received signals to produce modified signals, wherein calculating the active power set points or reactive set points for the power-producing unit is based on the modified signals.

\* \* \* \* \*